(12) United States Patent
Folino et al.

(10) Patent No.: US 6,270,442 B1
(45) Date of Patent: Aug. 7, 2001

(54) MULTI-FUNCTION SPEED CONVERTER

(75) Inventors: Frank A. Folino, Salem; Faruk H. Bursal, Waltham, both of MA (US); Michael P. Cunningham, Londonderry, NH (US); James E. Maslow, Lexington, MA (US)

(73) Assignee: Synkinetics, Inc., Lowell, MA (US)

( * ) Notice: Subject to any disclaimer, the term of this patent is extended or adjusted under 35 U.S.C. 154(b) by 0 days.

(21) Appl. No.: 08/812,056

(22) Filed: Mar. 8, 1997

(51) Int. Cl.[7] ..................................................... F16H 15/08
(52) U.S. Cl. ................................ 476/18; 476/36; 475/196
(58) Field of Search ..................... 475/195, 196; 476/18, 36

(56) References Cited

U.S. PATENT DOCUMENTS

| | | |
|---|---|---|
| 900,598 | 10/1908 | Schuermann . |
| 1,568,290 | 1/1926 | Morison .................................. 74/25 |
| 2,512,272 | 6/1950 | Gull ........................................ 74/63 |
| 2,565,828 | 8/1951 | Vivie . |

(List continued on next page.)

FOREIGN PATENT DOCUMENTS

| | | | |
|---|---|---|---|
| 801421 | 1/1951 | (DE) ...................................... 74/650 |
| 24.020 | 2/1922 | (FR) . |
| 1.021.945 | 2/1953 | (FR) . |
| 2346611 | 10/1977 | (FR) ...................................... 74/650 |
| 710543 | 6/1952 | (GB) . |
| 59-133863 | 8/1984 | (JP) . |
| 59-180153 | 10/1984 | (JP) . |
| 60-4663 | 1/1985 | (JP) . |
| 60-129462 | 7/1985 | (JP) . |
| 60-146954 | 8/1985 | (JP) . |
| 60-168954 | 9/1985 | (JP) . |
| 60-179563 | 9/1985 | (JP) . |
| 2253037 | 10/1990 | (JP) . |
| 1257331 | 9/1986 | (RU) . |
| 1368545 | 1/1988 | (RU) . |
| 1569470 | 6/1990 | (RU) . |
| 1206528 | 4/1978 | (SU) . |
| 629387 | 9/1978 | (SU) . |
| 1399548 | 12/1986 | (SU) . |
| 1490-362 | 6/1987 | (SU) . |
| 1618940 | 1/1989 | (SU) . |
| 1754990 | 4/1990 | (SU) . |
| WO 92/16775 | 10/1992 | (WO) .............................. F16H/25/06 |
| WO 94/18472 | 8/1994 | (WO) .............................. F16H/1/34 |
| WO 94/29617 | 12/1994 | (WO) .............................. F16H/15/08 |

OTHER PUBLICATIONS

"Balls Reduce Speed and Transmit Torque", *Mechanical Engineering & Technology Guide*,; publ. prior to Mar. 14, 1991.

Dojen™ Precision Rotary Actuator Designer's Guide (Dir. of Lenze, Woburn, MA), published prior to Mar. 14, 1991.

"General Information on Sinusoidal Ball Drives", *Soviet Engineering Research*, vol. 6 (1986) Feb., No. 2 @ pp. 23–26, Mowbray, Leicestershire G.B. (also referenced as *Sov. Engineering Research*, V. Mashinostroeniya, Jun. 1986, Issue 2, pp. 24–28).

*Primary Examiner*—Khol Q. Ta
(74) *Attorney, Agent, or Firm*—Perkins, Smith & Cohen, LLP; Jacob N. Erlich; Jerry Cohen

(57) ABSTRACT

Methods and apparatus for translating angular velocity and rotary motive force of an input drive to angular velocity and rotary motive force of an output drive, by providing a pair of devices rotatable at, relative to or about a common axis, and translating means for transmitting angular velocity and rotary motive force of a first of the devices to angular velocity and rotary motive force of a second of the devices.

15 Claims, 14 Drawing Sheets

U.S. PATENT DOCUMENTS

| | | | |
|---|---|---|---|
| 2,841,036 | 7/1958 | Decker | 74/650 |
| 3,039,324 | 6/1962 | Waterfield | 74/63 X |
| 3,049,019 | 8/1962 | Lapointe et al. | 476/36 |
| 3,278,155 | 10/1966 | Jehn. | |
| 3,319,925 | 5/1967 | Kojima et al. | |
| 3,424,018 | 1/1969 | Alsch | 476/38 |
| 3,468,175 | 9/1969 | Rabek | 74/63 |
| 3,477,693 | 11/1969 | Benzanis. | |
| 3,516,267 | 6/1970 | Uhlir. | |
| 3,807,243 | 4/1974 | Yada | 74/63 |
| 3,852,998 | 12/1974 | Leeson | 74/63 |
| 4,241,897 | 12/1980 | Maezawa | 74/424.8 VA |
| 4,476,735 | 10/1984 | Cantwell | 74/84 R |
| 4,477,054 | 10/1984 | Danby et al. | 751/122 |
| 4,584,904 | 4/1986 | Distin, Jr. et al. | 74/63 |
| 4,643,047 | 2/1987 | Distin et al. | 74/63 |
| 4,829,851 | 5/1989 | Imase | 74/798 |
| 4,867,009 | 9/1989 | Hudson | 74/650 |
| 4,922,781 | 5/1990 | Peiji | 74/462 |
| 4,930,746 | 6/1990 | Reinicke et al. | 251/129.11 |
| 4,960,003 | 10/1990 | Hartley | 74/63 |
| 4,973,295 | 11/1990 | Lee | 475/153 |
| 5,016,487 | 5/1991 | Bollmann | 476/36 |
| 5,312,306 | 5/1994 | Folino | 475/196 |
| 5,321,988 | 6/1994 | Folino | 74/25 |
| 5,443,428 | 8/1995 | April et al. | 475/163 |
| 5,461,941 | 10/1995 | Young | 74/650 |
| 5,514,045 | 5/1996 | Folino | 476/36 |
| 5,562,564 | 10/1996 | Folino | 476/36 |
| 5,577,423 | 11/1996 | Mimura | 74/650 |
| 5,600,999 | 2/1997 | Folino | 74/122 |
| 5,607,370 | 3/1997 | Maslow et al. | 475/196 |
| 5,683,323 | 11/1997 | Imase | 475/168 |
| 5,722,910 | 3/1998 | Folino | 476/36 |

MULTI-FUNCTION SPEED CONVERTER

This invention was made under a program sponsored by the U.S. government, under contract number DAGS60-95-C-0110, awarded by DARPA. The U.S. government has certain rights in the invention.

BACKGROUND OF THE INVENTION

The present invention relates to multi-function mechanical power transmissions, and more particularly, to speed reducers and the like with wide versatility.

Speed conversion is an important capability in the efficient utilization of rotary motive force. The occasion often arises for increasing or reducing of the speed of a drive member to a higher or lower speed at a driven member. Typically in these applications, a speed reducer housing is mounted ("grounded") directly to the equipment housing. At times the effect of speed reduction is also referred to as torque amplification, and these concepts may be treated as interchangeable, for purposes of this disclosure.

It is therefore an object of the present invention to provide a speed converter which is simplified in nature but is robust in transmission capability.

It is an additional object of the present invention to provide a speed converter design which is adaptable to a variety of situations.

It is an additional object of the present invention to provide a washing machine drive design with a minimum of brakes, pulleys, belts, solenoids and the like.

SUMMARY OF THE INVENTION

New drive concepts, such as for washing machines, are disclosed. In a preferred embodiment, the spin and agitation functions are performed without the need for cycling the motor or altering its speed of rotation. The switch from agitation to spin mode involves only a change in the direction of rotation of the motor.

These concepts and the above and other objects are well met by the presently disclosed, highly efficient, speed converting assembly of the present invention.

A preferred embodiment includes a speed converter apparatus for translating an input at a first velocity to an output at a second velocity. The speed converter has a primary drive disk defining a primary cam (a "drive" "cam-gear") for providing a rotary motion input at a first angular velocity.

The speed converter apparatus also includes a driven assembly. The driven assembly has a secondary cam (also a "cam-gear") on a secondary disk, and an intermediate disk element. The intermediate disk is a direction-dictating, directional element, located between the primary and secondary disks. The intermediate disk has slots for receipt of transmission elements (balls) therein. The speed converter output is taken from a driven disk, which is either the intermediate disk or the secondary disk.

In various embodiments, the primary and secondary cam-gears are each formed on a face of a respective primary and secondary disk, and the slots are formed as radial slot paths in the intermediate disk. Each of the primary and secondary cam-gears has a respective flank. Projections of these flanks intersect at unique points upon rotation of the primary cam-gear, associated ones of these unique points defining respective ones of the slot paths in the intermediate disk.

A respective ball in a respective slot path is driven radially between a maximum and minimum radius by the primary cam-gear. In one embodiment, the slotted intermediate disk is a reaction disk for reacting the drive force on the balls in the slots, and the secondary cam-gear is driven into rotation by action of the oscillating balls. In another embodiment, the slotted intermediate disk is driven into rotation by action of the oscillating balls, with the drive force on the balls being reacted by the secondary cam-gear, where the secondary disk is a reaction disk.

Overall, the primary cam-gear is designed to cause a linear displacement of the balls for a given cam-gear rotation. The secondary cam-gear is configured for conjugate action with the primary cam-gear, and which results in constant linear velocity of the radially traveling balls. The primary and secondary cam-gears are thus referred to as a conjugate pair. The centerline of a respective slot is defined as the loci of the contact of the cam-gears at the slots' given angular location.

In one embodiment, the primary cam-gear contour varies substantially linearly with angular rotation at a first rate of variation. The secondary cam-gear contour varies substantially linearly with angular rotation at a second rate of variation. The relationship of these variations determines the speed conversion ratio of the apparatus. In accordance with the foregoing, the speed ratio of the apparatus can be determined by comparing the inverse of the number of cycles of the primary cam-gear to the number of cycles of the secondary cam-gear.

In such embodiment of the invention, the first cam-gear device is formed as a face cam-gear on the primary cam-gear disk, and in simplest form has one lobe (or cycle) starting at a base circle radius and proceeding about the center of the disk at a constantly increasing radius and at a constant angular rotation to a maximum radius at 180°, i.e., in the rise mode, and then proceeding in the fall mode at a decreasing radius of the same rate and constant angular rotation back to the original base circle radius, completing 360°.

The second cam-gear device is formed as a multi-cycle face cam-gear track on a second cam-gear disk, and is mounted in a position facing the face cam-gear track of the primary cam-gear disk. Each cycle of this face cam-gear track defines a rise mode and a fall mode. Each rise and fall mode of the plurality of cycles in the secondary cam-gear are configured to have the same radial displacement, for uniform conversion.

The invention also enables use of interim cam-gears, which enables staging of speed reduction. Specifically, a first face of an interim cam-gear has an interim secondary cam-gear which interacts with the primary cam-gear and a second face of the interim cam-gear has an interim primary cam-gear which interacts with the secondary cam-gear. Thus two or more stages of reduction can be created in a compact speed reducer of the invention.

The invention can produce constant rotational velocity for 360° rotation at the output, with torque transmission through each of the moving balls for 360° of rotation at the output. Ideally, all or substantially all of the balls share the load continuously, thereby decreasing the unit load on each ball, except for when for the moment when any one of the balls is in transition. The slopes at each of the primary and secondary cam-gear curve segments are designed for conjugate action so that essentially smooth and constant radial displacement of the moving balls occurs, in interaction with the intermediate disk and secondary cam-gear. The crossover angles between the drive and secondary cam-gears is essentially the same at all ball locations without much variation over the entire ball movement, with the ball movement having substantially constant linear velocity, except for when the balls approach their transition at the minimum and maximum displacements for reversal of their direction of travel.

In the above embodiments, the intermediate disk is shown fixed relative to the conjugate pair of primary and secondary cam-gears/disks, but the present invention is not limited to constant motion output. In another embodiment of the invention, the intermediate disk is allowed to obtain an angular velocity at a controlled and variable rate, and this in turn provides speed conversion at a controllable and variable rate at the driven secondary disk output. By changing the angular velocity of the intermediate disk, a variance of output is achieved.

In a reversing embodiment of the invention, the primary cam-gear, intermediate disk and secondary cam-gear are still required, although with variation of the angles of the slots of the slotted disk. Thus it is possible to interchange a reverse-motion intermediate disk with a non-reversing intermediate disk, so as to convert from the smooth, continuous output of the ball drive in one direction to a smooth reversed-motion output, all with the same drive input rotation. (In this application, the non-reversing intermediate disk at times is referred to as a "conventional" intermediate disk.)

The slot locations and the slot angles are selected in recognition of the fact that for a clockwise rotating primary cam-gear, the intermediate disk must locate the balls such that the rise side of the primary cam-gear interacts with the clockwise side of the cycles of the secondary cam-gear (for clockwise driven rotation) or with the counterclockwise side of the cycles of the secondary cam-gear (for counterclockwise driven rotation). Thus the configuration of the intermediate disk is changed according to whether a reversing or non-reversing output is desired.

In a multi-stage embodiment of the invention, multiple rotating output shafts can be presented concentrically. It is also possible to provide a multi-stage embodiment of the invention in which counter-rotating concentric output shafts are presented in a special torque-splitting configuration. The input torque is applied via clockwise rotation of the drive member via a primary cam-gear on one side of a double-sided drive member, via a set of balls, via an intermediate disk and via a secondary cam-gear, the latter integral with an output shaft. At the same time, the input torque is also applied via clockwise rotation of the primary cam-gear counter-clockwise via another set of balls, a reversing intermediate disk and a secondary cam-gear, the latter integral with another output. Hence, rotation of the input clockwise will rotate a first output shaft clockwise and a concentric second output shaft counter-clockwise, simultaneously, with the input torque split between each according to the capacities of each of the reducer stages.

In an alternative embodiment, a pancake drive has spacer balls, a secondary cam-gear that is integral with the housing, and an output taken from the reaction disk. The spacer balls act as thrust bearings while they locate and stablize the primary disk. A splined input enables mating of drive on the shaft of a drive. A splined output enables mating of the output on the shaft of a driven load.

In an other embodiment of the invention, apparatus is provided for spinning the tub, and for oscillating the agitator, of a washing machine, the agitator agitating when the tub is stationary. The apparatus features a first stage for oscillating the clothing agitator and a second stage for spinning the tub. Also, a drive arrangement rotates in a first and second direction, for spinning the first and second stage in unison in the first direction when the tub is spinning, and for oscillating the agitator when the tub is stationary when the drive arrangement is rotating in the second direction.

In a preferred embodiment of the invention, the curvature of the primary and secondary tracks must be conjugate and the generation of these curves is optimized by modifying the tip of the cam-gear teeth (i.e., the cam-gear tooth tip at the maximum and minimum radius) for a more graceful transition of the ball going from radially out to radially in. (This also holds true for axially out and axially in for a cylindrical embodiment of the invention.) Disclosed is a description of a higher-order tooth tip modification, and related formulas that enable modification of the basic cam-gear waveform disclosed in U.S. Pat. No. 5,312,306, where n=3 gives the a cubic and n=4 gives a quartic variation, and where all such polynomials enable a beneficial tip modification.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 11(*a*) shows the first stage input of FIG. 11.

FIG. 11(*b*) shows the reaction disk of FIG. 11.

FIG. 11(*c*) shows the intermediate bridge cam-gear of FIG. 11.

FIG. 11(*d*) shows the table top and two second stage output cam-gears of FIG. 11.

DETAILED DESCRIPTION OF A PREFERRED EMBODIMENT

A known single-stage speed reducer using flat plates includes a housing, a plurality of balls, a primary "(drive")" disk coupled to an input shaft, a secondary disk coupled to an output shaft, and an intermediate disk coupled to the housing. The secondary disk is a driven disk. The drive disk is mounted in the housing by means of an input bearing or bushing and the driven disk is mounted in the housing by means of output bearing or bushing. Preferably the drive disk and the driven disk are each coaxial about the central axis of the device.

Figure 1:
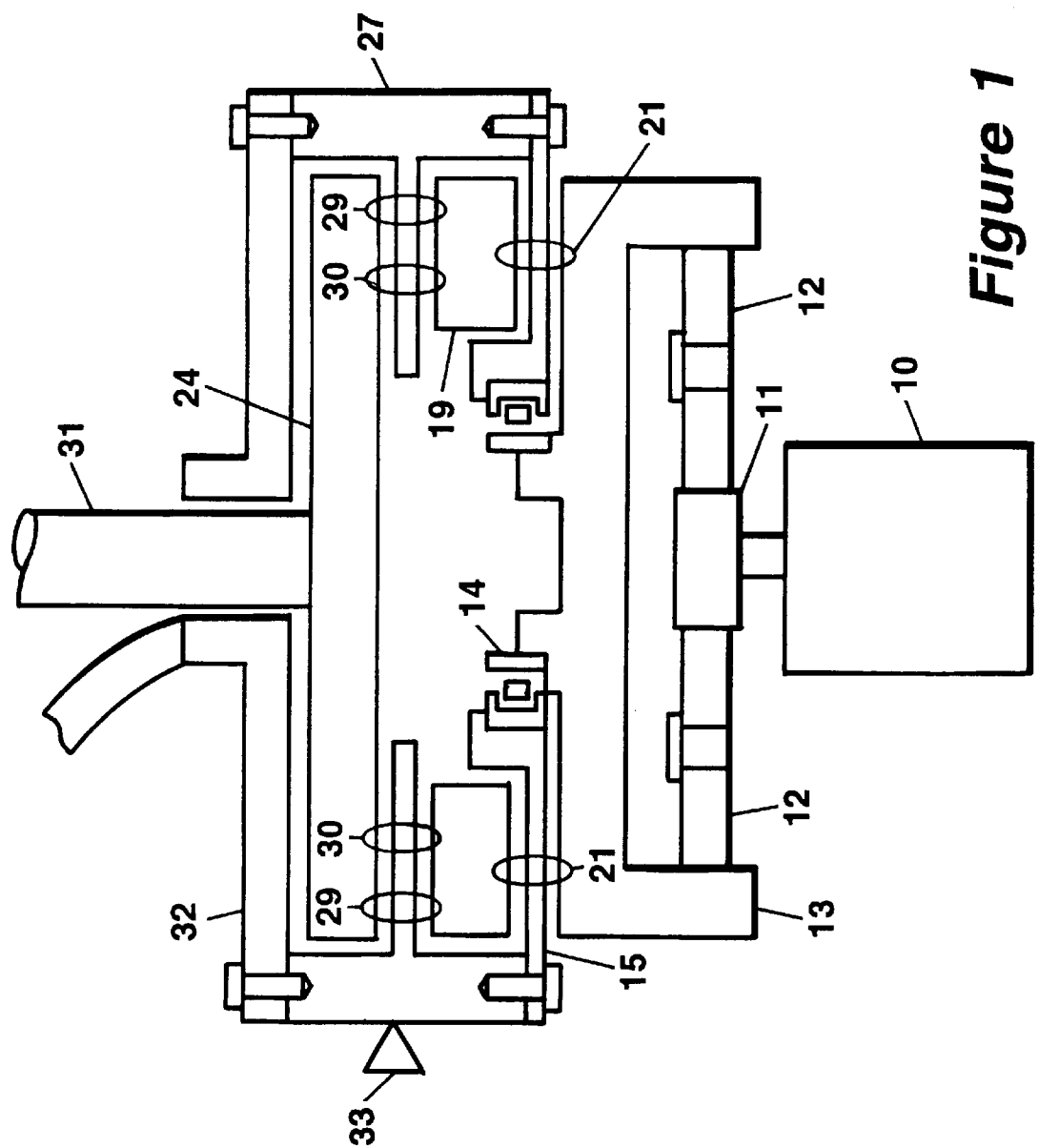
FIG. 1 is a side cross-section f a washing machine drive embodiment of the invention.
Figure 2:
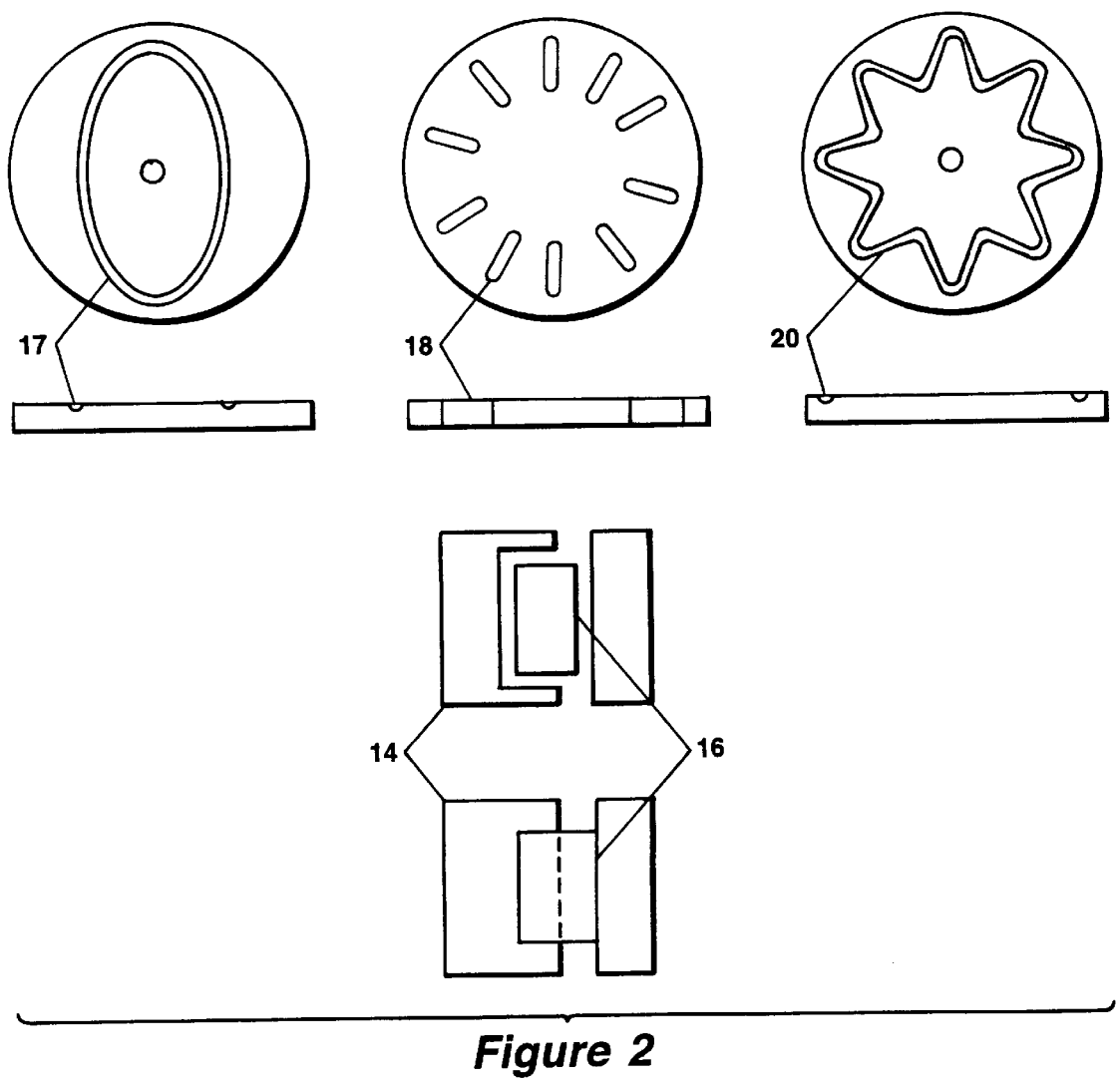
FIG. 2 shows the cooperating elements of the drum drive of FIG. 1.
Figure 3:
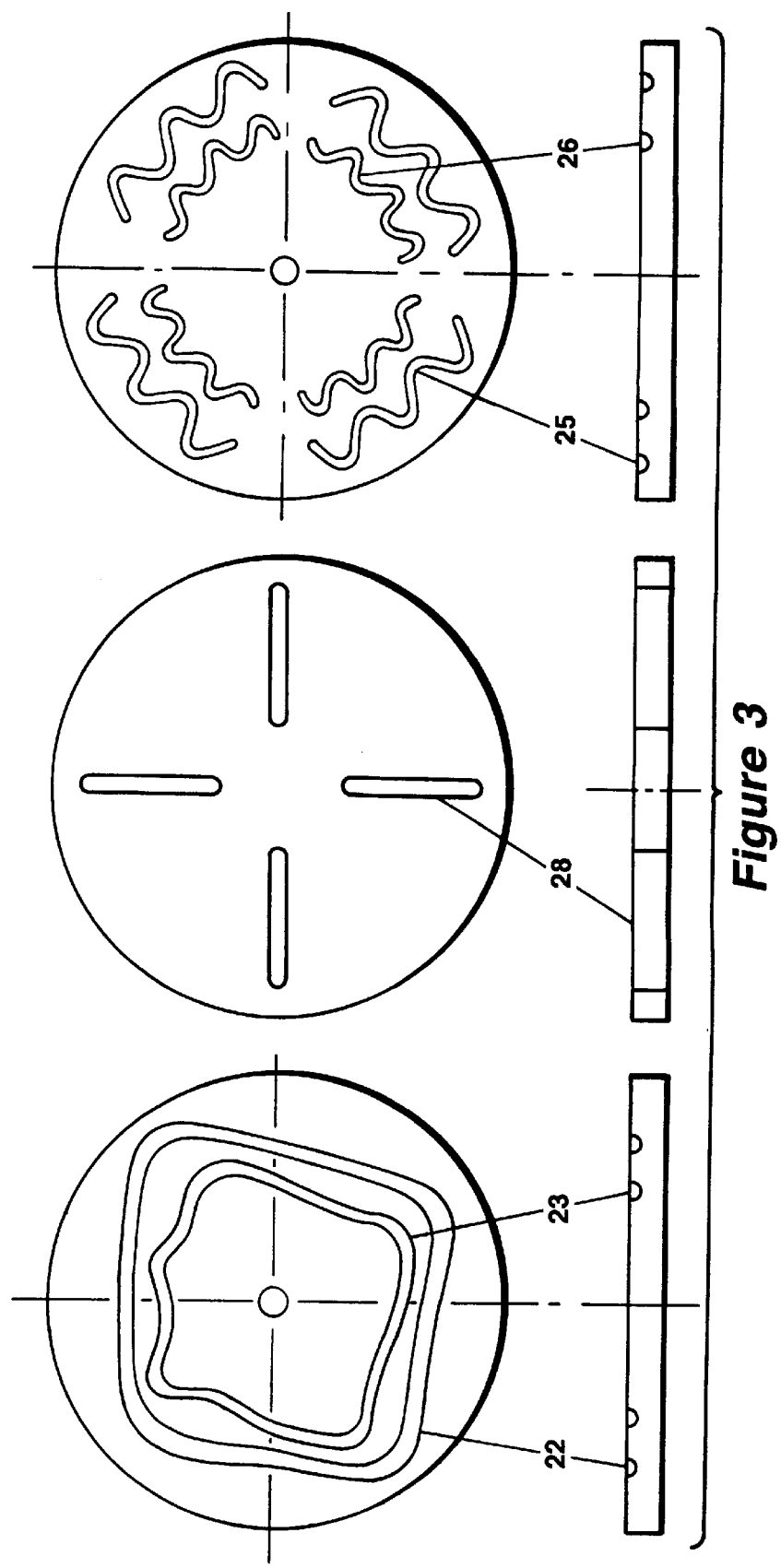
FIG. 3 shows the oscillating cam-gear set for the agitator of the device of FIG. 1.

In one embodiment of the present invention device, described with respect to FIGS. 1–3, motor 10 drives pinion 11, which engages two or more idler cam-gears 12 spindled on ground and arranged in a symmetrical manner around said pinion. In turn, the idler cam-gears drive an internal cam-gear teeth formed on input cam-gear 13. A first stage of speed reduction is achieved by this cam-gearing arrangement. Cam-gear 13 holds one race of a roller clutch 14, while the other race is attached to slotted plate 15. Roller clutch 14 (like other roller clutches herein referred to) has one race with an internal geometry that lets rollers 16 spin freely in one direction of rotation (overrun mode), such that it acts essentially like a roller bearing, or else wedges the rollers between the two races in the opposite direction of rotation (lock mode), such that both races must have the same velocity. Cam-gear 13 also has machined into its face a cam-gear groove of type 17, while slotted plate 15 has slots in an arrangement similar to 18. On the other side of slotted plate 15, an intermediate cam-gear bridge 19 has machined into its face a cam-gear groove of type 20. Captured in slots 18 and between cam-gear grooves 17 and 20 are a complement of balls 21. On the other side of intermediate cam-gear bridge 19 are machined two or more concentric cam-gear grooves of type 22,23. These grooves are opposed on an output cam-gear 24 by another set of concentric but discrete cam-gear grooves of type 25,26. Cam-gear grooves 22,23 are phase-shifted from each other to prevent their being at maximum or minimum radius simultaneously. Cam-gear grooves 25,26 are similarly phase-shifted from each other, as indicated by the shifted axes shown in FIG. 3. Between the parts defined as 19 and 24 is another slotted plate 27 with slots in an arrangement like 28. Cam-gear grooves 22,23 and 25,26 capture two complements of balls 29,30 in slots 28. Output cam-gear 24 is attached to agitator shaft 31, while slotted plates 15 and 27 are rigidly connected to each other and to the tub of the washing machine by way of connector 32. Also provided is a brake 33 which either arrests the group of parts 15, 27 and 32 or lets them rotate freely.

In this embodiment, the spin function is accomplished by causing the tub and agitator to rotate at the same speed. Brake 33 is therefor released, allowing the assembly of parts 15, 27 and 32 to rotate freely, while motor 10 is run in the direction that corresponds to the lock mode of roller clutch 14. As a result, cam-gear 13 and slotted plate 15 turn at the same speed that is reduced from that of the motor by the cam-gearing. In turn, because cam-gear 13 and slotted plate 15 are rotating at the same speed, balls 21 and intermediate cam-gear 19 rotate at same said speed. Continuing analogously, slotted plate 27, balls 29,30 and output cam-gear 24 all rotate at same said speed, as do agitator shaft 31 and connector 32 to the tub of the washing machine.

Also in this embodiment of the device, the agitation function is accomplished by engaging brake 33 to arrest parts 15, 27 and 32 (and hence the tub of the washing machine), while running motor 10 in the direction that corresponds to the overrun mode of roller clutch 14. Input cam-gear 13 rotates at a speed that is reduced from that of the motor by the cam-gear train. The cam-gear groove of type 17 moves balls 21 radially in and out in the (now stationary) slots 18 in plate 15. The balls then act on the opposing cam-gear groove of type 20 and effect a rotation of intermediate cam-gear 19 at a speed that is further reduced from that of input cam-gear 13. In turn, the cam-gear grooves of type 22,23 on the other face of intermediate cam-gear 19 move balls 29,30 radially in and out in the (now also stationary) slots 28 in plate 27. These balls then act on the opposing cam-gear grooves of type 25,26 on output cam-gear 24 and cause it to move in an oscillatory manner about its centerline. Output cam-gear 24 thus drives agitator shaft 31 to perform the agitation function of the washing machine, while the tub of the machine is held stationary.

Figure 4:
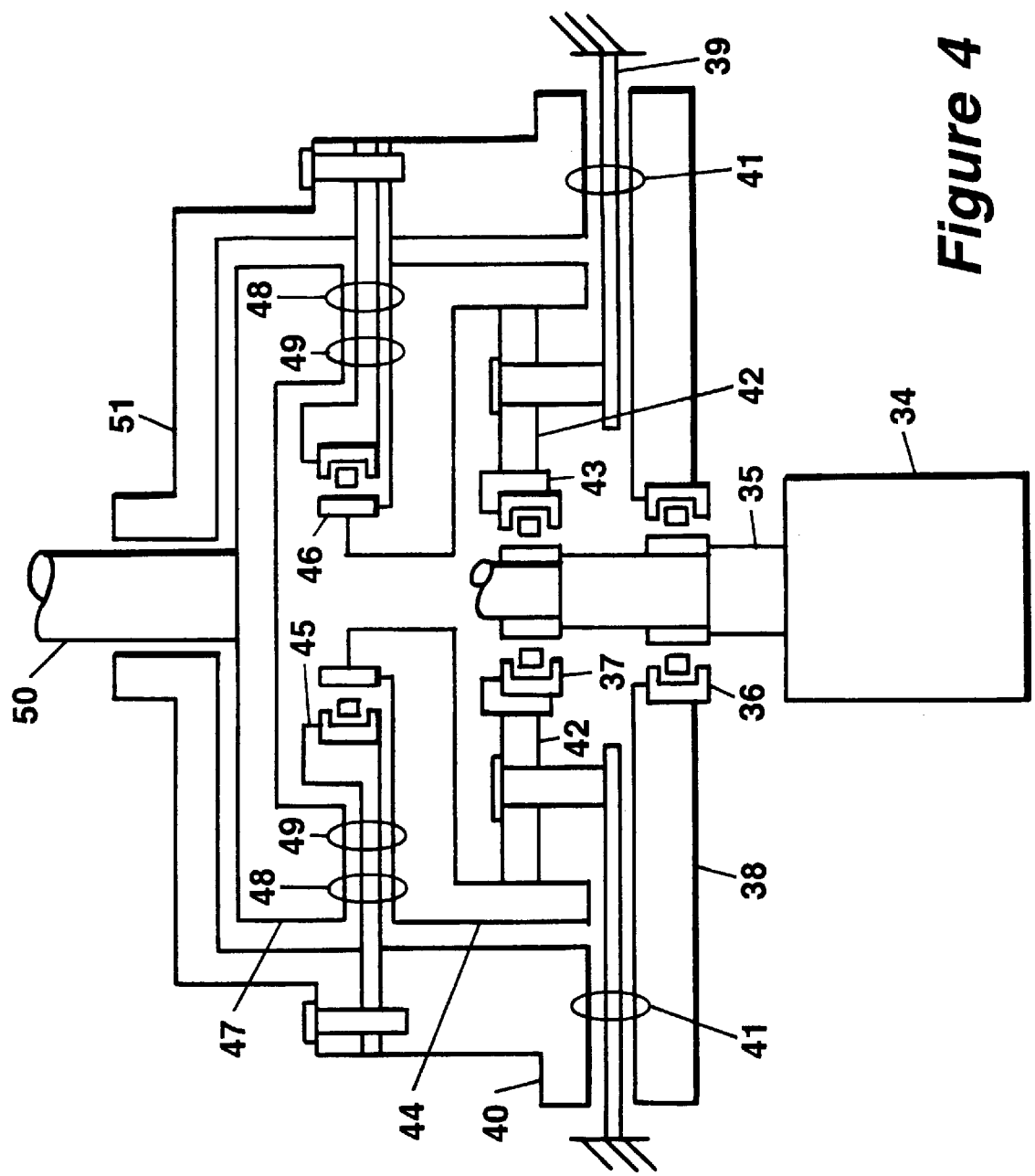
FIG. 4 is an alternative embodiment of the device of FIG. 1.

In another embodiment of the invention shown related to FIG. 4, the brake is eliminated in favor of two additional roller clutches. Motor 34 turns shaft 35, on which are mounted the inner races of said additional roller clutches 36 and 37. Attached to the outer race of roller clutch 36 is an input cam-gear 38, which has machined into its face a cam-gear groove of the type 17. Adjacent to input cam-gear 38 is a slotted plate 39 that is grounded on its periphery and has an arrangement of slots similar to 18. On the other side of plate 39 from input cam-gear 38 is an outer cam-gear 40 with cam-gear grooves of type 20 cut into its face. These grooves, along with those on input cam-gear 38, confine balls 41 to the slots in plate 39. Plate 39 also acts as the anchor for two or more idler cam-gears 42 that are positioned symmetrically around cam-gear 43, which in turn is attached to the outer race of roller clutch 37. Said idler cam-gears engage internal cam-gear teeth on an intermediate cam-gear 44 that has two or more concentric cam-gear grooves of type 22,23 cut into its face. Intermediate cam-gear 44 is connected to slotted plate 45 through a third roller clutch 46. Said slotted plate has slots in an arrangement similar to 28. On the other side of slotted plate 45 from intermediate cam-gear 44 is an output cam-gear 47, with a set of concentric but discrete cam-gear grooves of type 25,26. Cam-gear grooves 22,23 are phase-shifted from each other to prevent their being at maximum or minimum radius simultaneously. Cam-gear grooves 25,26 are similarly phase-shifted from each other. Between them, cam-gear grooves 22,23 and 25,26 capture two complements of balls 48,49 in slots 28. Output cam-gear 47 is attached to agitator shaft 50, while outer cam-gear 40 and slotted plate 45 are rigidly connected to each other and to the tub of the washing machine by way of connector 51.

In this embodiment, the spin function is accomplished by running motor 34 in the direction that corresponds simultaneously to the overrun mode of roller clutch 37 and the lock mode of roller clutch 36. Input cam-gear 38 is thus driven at the speed of the motor, and the cam-gear groove of type 17 moves balls 41 radially in and out in slots 18 in plate 39. The balls then act on the opposing cam-gear groove of type 20 and effect a rotation of outer cam-gear 40 at a speed that is reduced from that of input cam-gear 38. This speed reduction stage is designed to be of non-backdriveable character. Roller clutch 46 is in lock mode and causes intermediate cam-gear 44 to rotate at the same speed as slotted plate 45. Cam-gears 42 and 43 spin freely. In turn, because cam-gear 44 and slotted plate 45 are rotating at the same speed, balls 48,49 and output cam-gear 47 rotate at same said speed, as do agitator shaft 50 and connector 51 to the tub of the washing machine.

Also in this embodiment of the device, the agitation function is accomplished by running the motor in the direction that corresponds simultaneously to the lock mode of roller clutch 37 and the overrun mode of roller clutch 36. Accordingly, intermediate cam-gear 44 is driven at a speed that is reduced from that of the motor by the cam-gearing. Roller clutch 46 is in overrun mode and allows intermediate cam-gear 44 to turn at said speed while slotted plate 45 is stationary. Slotted plate 45, in turn, is held stationary by the fact that the cam-gear speed reduction between input cam-gear 38 and outer cam-gear 40 is designed to be non-backdriveable. The cam-gear grooves of type 22,23 on the face of intermediate cam-gear 44 move balls 48,49 radially in and out in the (now stationary) slots 28 in plate 45. These balls then act on the opposing cam-gear grooves of type 25,26 on output cam-gear 47 and cause it to move in an oscillatory manner about its centerline. Output cam-gear 47 thus drives agitator shaft 50 to perform the agitation function of the washing machine, while the tub of the machine is held stationary.

Figure 5:
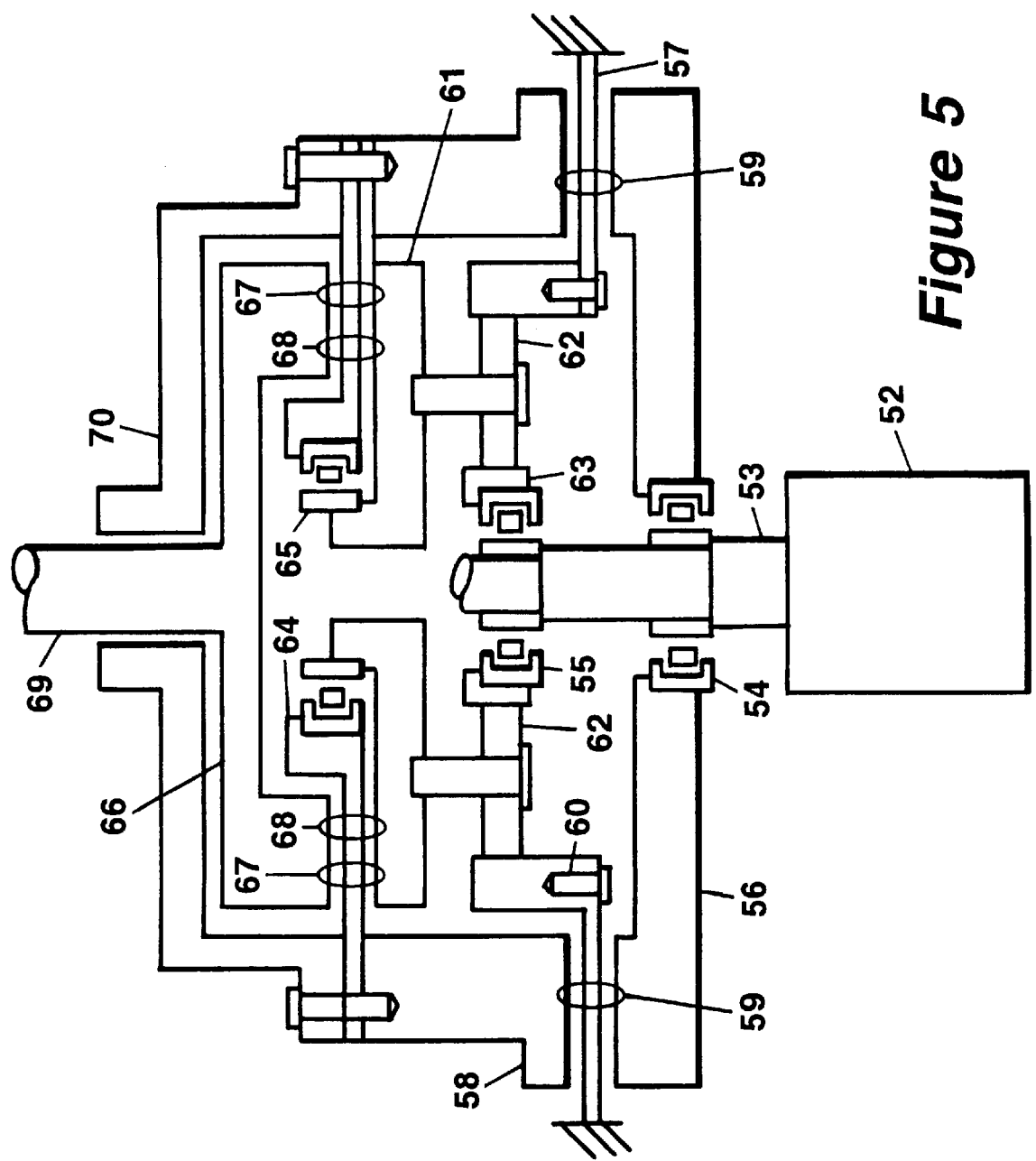
FIG. 5 is another alternative embodiment of the device of FIG. 1.

In yet another embodiment of the invention shown related to FIG. 5, the cam-gear train is altered such that the internal (ring) cam-gear is fixed to ground, while the idlers are spindled on the intermediate cam-gear. Motor 52 turns shaft 53, on which are mounted the inner races of roller clutches 54 and 55. Attached to the outer race of roller clutch 54 is an input cam-gear 56, which has machined into its face a cam-gear groove of the type 17. Adjacent to input cam-gear 56 is a slotted plate 57 that is grounded on its periphery and has an arrangement of slots similar to 18. On the other side of plate 57 from input cam-gear 56 is an outer cam-gear 58 with cam-gear grooves of type 20 cut into its face. These grooves, along with those on input cam-gear 56, confine balls 59 to the slots in plate 57. Plate 57 also acts as the anchor for an internal (ring) cam-gear 60. Spindled on an intermediate cam-gear 61 are two or more idler cam-gears 62 positioned symmetrically around cam-gear 63, which in turn is attached to the outer race of roller clutch 55. Intermediate cam-gear 61 has two or more concentric cam-gear grooves of type 22,23 cut into its face, and is connected to slotted plate 64 through a third roller clutch 65. Said slotted plate has slots in an arrangement similar to 28. On the other side of slotted plate 64 from intermediate cam-gear 61 is an output cam-gear 66, with a set of concentric but discrete cam-gear grooves of type 25,26. Cam-gear grooves 22,23 are phase-shifted from each other to prevent their being at maximum or minimum radius simultaneously. Cam-gear grooves 25,26 are similarly phase-shifted from each other. Between them, cam-gear grooves 22,23 and 25,26 capture two complements of balls 67,68 in slots 28. Output cam-gear 66 is attached to agitator shaft 69, while outer cam-gear 58 and slotted plate 64 are rigidly connected to each other and to the tub of the washing machine by way of connector 70.

In this embodiment, the spin function is accomplished by running motor 52 in the direction that corresponds simultaneously to the overrun mode of roller clutch 55 and the lock mode of roller clutch 54. Input cam-gear 56 is thus driven at the speed of the motor, and the cam-gear groove of type 17 moves balls 59 radially in and out in slots 18 in plate 57. The balls then act on the opposing cam-gear groove of type 20 and effect a rotation of outer cam-gear 58 at a speed that is reduced from that of input cam-gear 56. This speed reduction stage is designed to be of non-backdriveable character. Roller clutch 65 is in lock mode and causes intermediate cam-gear 61 to rotate at the same speed as slotted plate 64. Cam-gears 62 and 63 spin freely. In turn, because cam-gear 61 and slotted plate 64 are rotating at the same speed, balls 67,68 and output cam-gear 66 rotate at same said speed, as do agitator shaft 69 and connector 70 to the tub of the washing machine.

Also in this embodiment of the device, the agitation function is accomplished by running the motor in the direction that corresponds simultaneously to the lock mode of roller clutch 55 and the overrun mode of roller clutch 54. Accordingly, intermediate cam-gear 61 is driven at a speed that is reduced from that of the motor by the cam-gearing. Roller clutch 65 is in overrun mode and allows intermediate cam-gear 61 to turn at said speed while slotted plate 64 is stationary. Slotted plate 64, in turn, is held stationary by the fact that the cam-gear speed reduction between input cam-gear 56 and outer cam-gear 58 is designed to be non-backdriveable. The cam-gear grooves of type 22,23 on the face of intermediate cam-gear 61 move balls 67,68 radially in and out in the (now stationary) slots 28 in plate 64. These balls then act on the opposing cam-gear grooves of type 25,26 on output cam-gear 66 and cause it to move in an oscillatory manner about its centerline. Output cam-gear 66 thus drives agitator shaft 69 to perform the agitation function of the washing machine, while the tub of the machine is held stationary.

A further teaching of the basic preferred cam-gear technology is shown in U.S. Pat. Nos. 5,312,306, 5,514,045 and 5,312,988, by Frank A. Folino, incorporated herein by reference.

Figure 6:
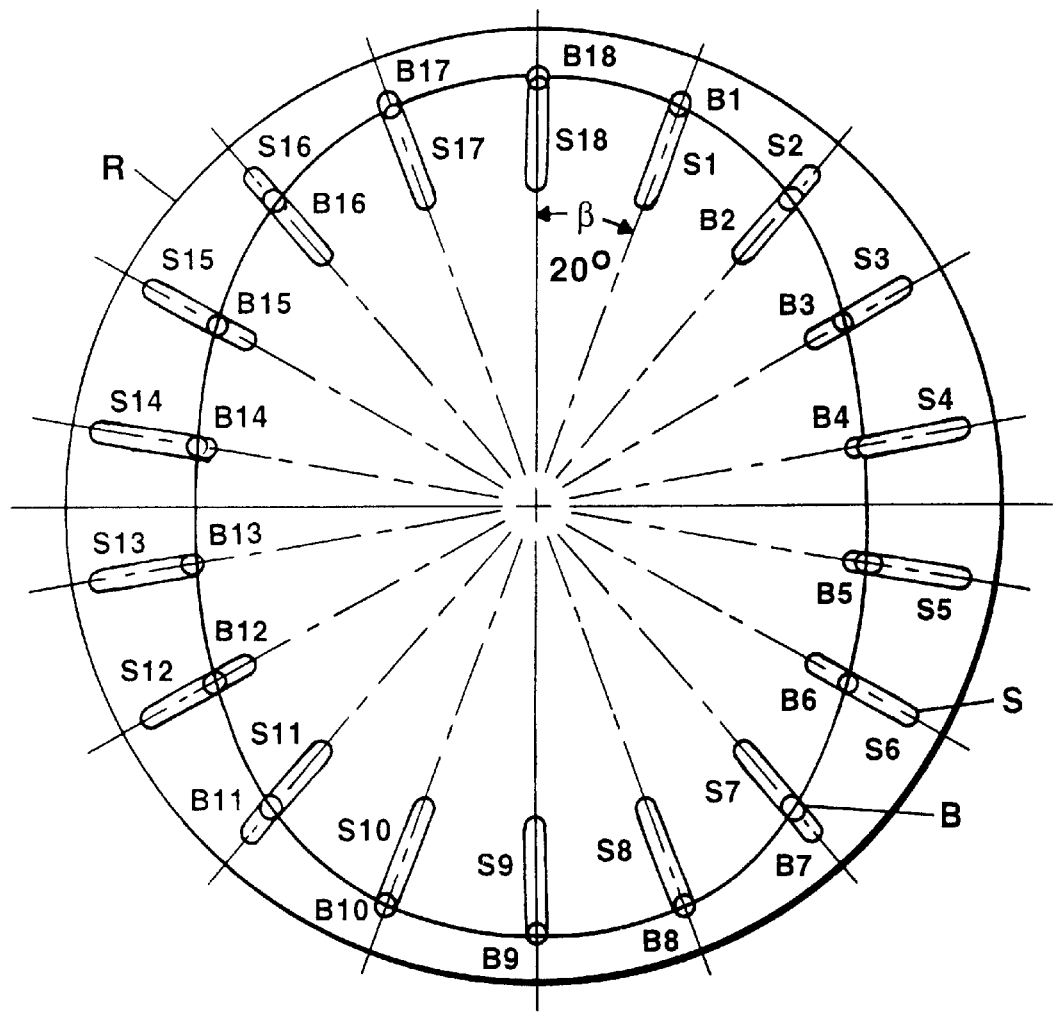
FIG. 6 shows a slotted reaction disk.

FIG. 6 shows the cooperation of a two tooth cam-gear and balls B in the slots S of an 18 slot reaction disk R. The slots each define a through hole in the reaction disk. The slots have flat flanks on which the balls roll as they move radially in and out.

Figure 7:
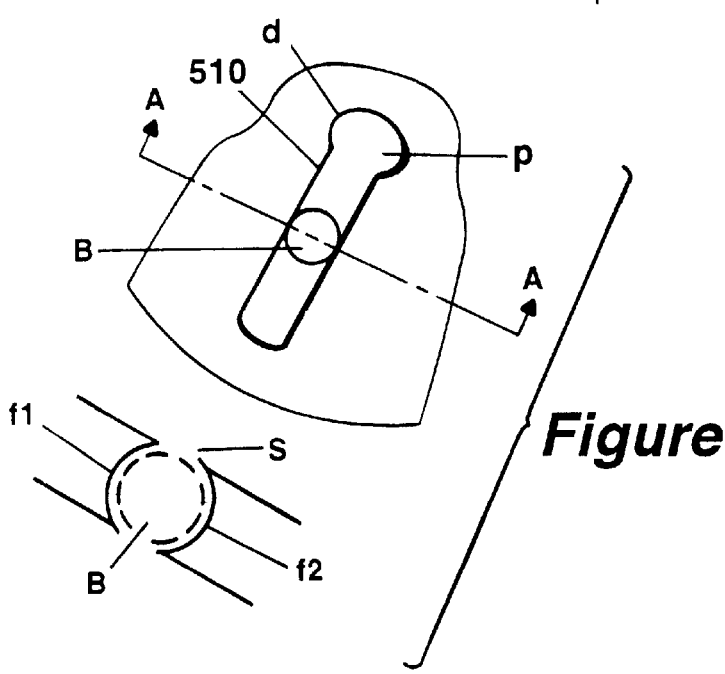
FIG. 7 shows an alternative capacity-increasing, ball-capturing, conforming slot design of the invention.

FIG. 7 shows in side cross-section an alternative configuration of the slots S. Slot S has opposed flanks f1 and f2, each of which is somewhat conforming to the shape of ball B. In this manner, a reaction disk with many such slots can be preloaded with respective balls. The slot is formed with a plunge cut p, at one end of the slot, so that the balls can be loaded into this "conforming" slot. A detent d is hammered into the edge of the plunge cut after the ball is loaded. Thus the balls once loaded cannot easily roll out of the assembly and are captured by the conforming flanks. This facilitates mass assembly and storage of such loaded reaction disks with balls. When needed for product repairs, such as in the field, then the reaction disk assembly comes with the balls already installed. This facilitates assembly of the slotted disk and balls into the entire drive mechanism, without the risk of lost balls, since the balls are captured and sealed in the conforming slots.

An additional advantage of this arrangement is that the conforming slot flanks, by virtue of conforming to the balls, say 60% conformity, enable the balls to have a larger contact patch against the slot flanks, and thus to be able to handle a higher Hertzian stress loading. This increases the load capacity of the entire mechanism.

Notwithstanding the foregoing, in a preferred embodiment of the invention, the curvature of the primary and secondary tracks must be conjugate and the generation of these curves is optimized by modifying the tip of the cam-gear teeth at the maximum and minimum radius for a more graceful transition of the ball going from radially out to radially in. (This also holds true for axially out and axially in for a cylindrical embodiment of the invention.)

Figure 8:
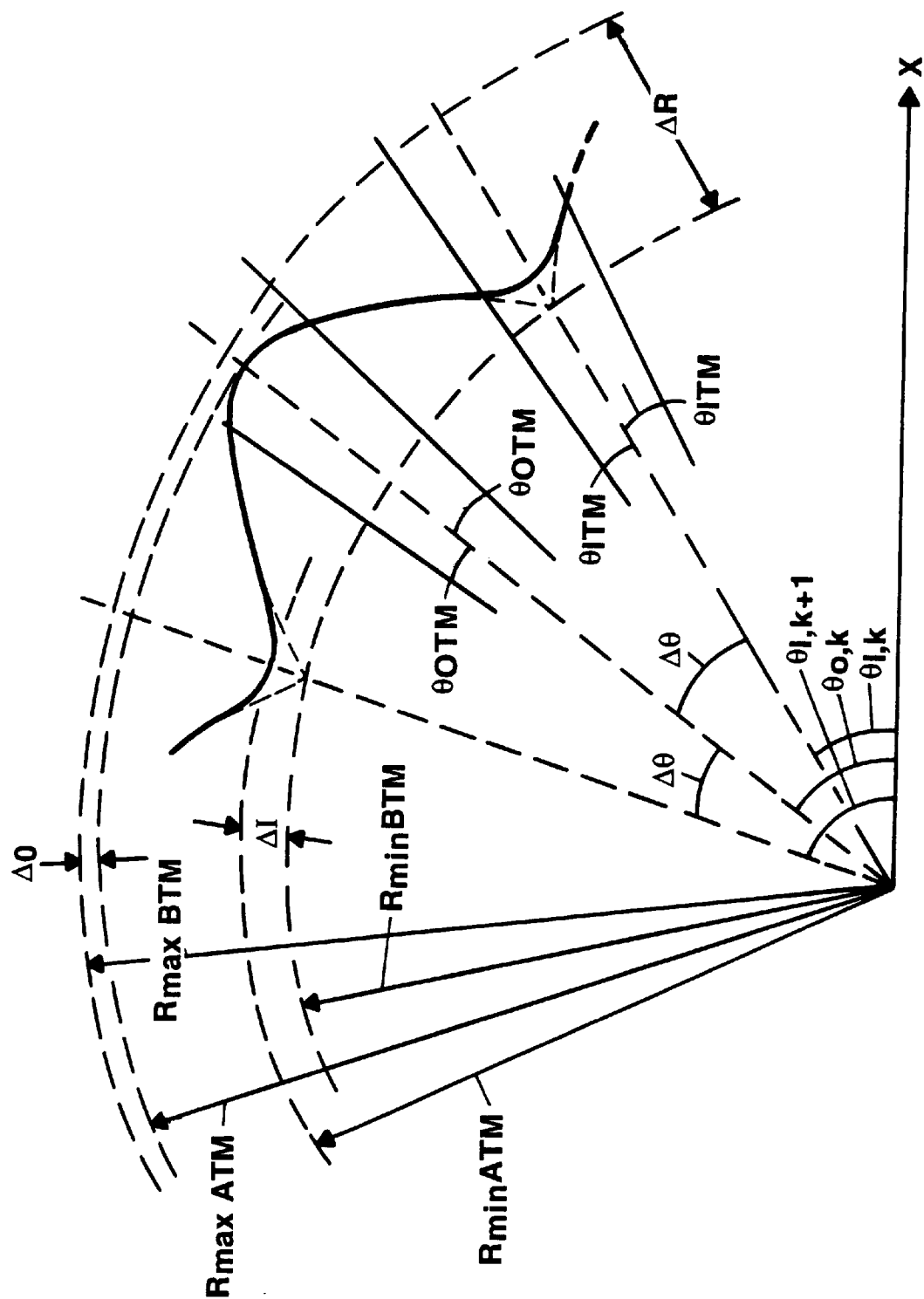
FIG. 8 shows the preferred linear spiral of the cam-gear tracks of the invention.
Figure 9:
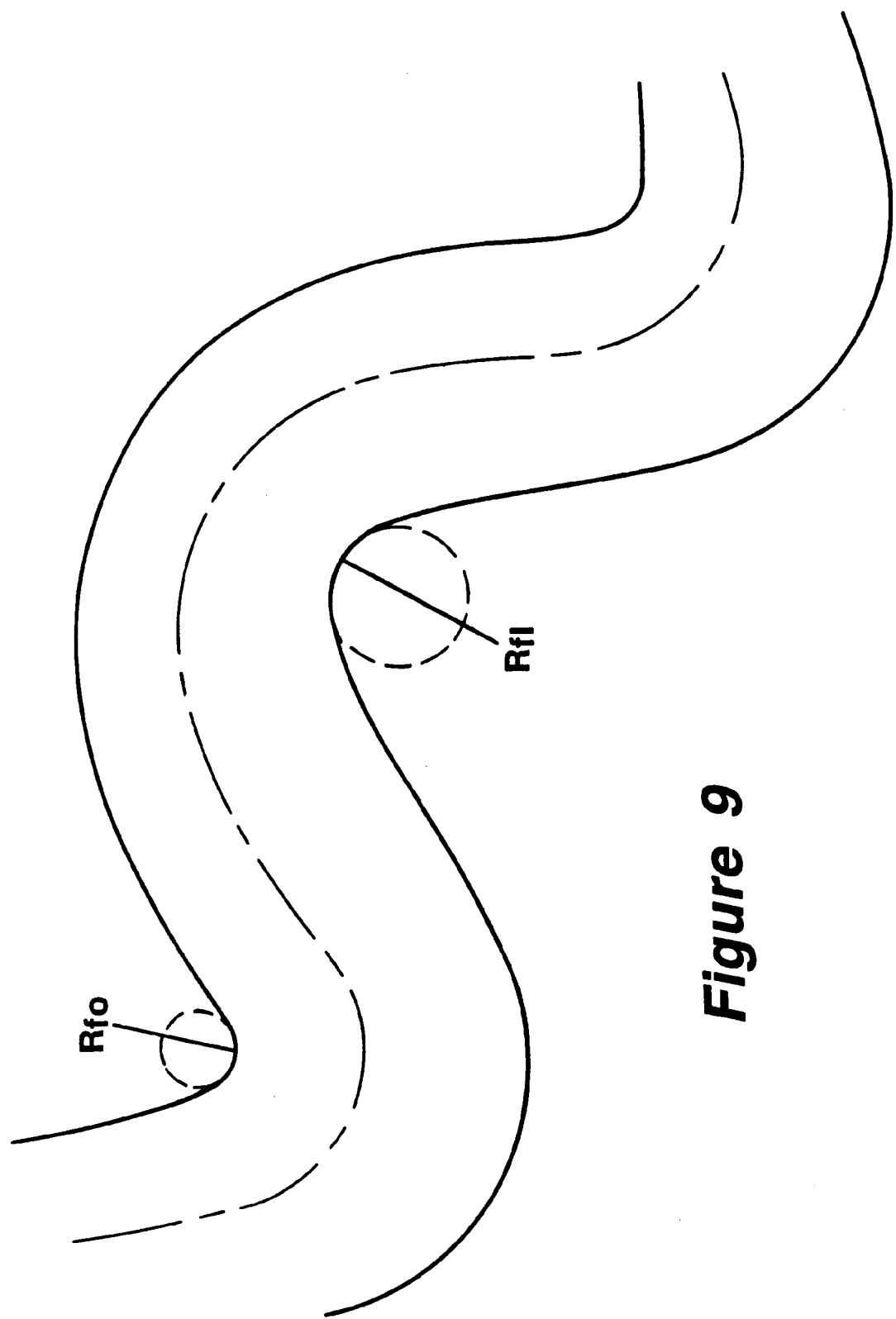
FIG. 9 a detailed view of a portion of one such track of FIG. 8.

The following is a description of this higher-order tip modification, and related formulas that enable modification of the basic waveform disclosed in U.S. Pat. No. 5,312,306, where n=3 gives the a cubic and n=4 gives a quartic variation, and where all such polynomials enable a beneficial tip modification. Reference is made to FIGS. 8–9.

In short, the following formulas are for smoothing of cam-gear teeth. These formulas allow for smooth reversal of ball motion in cam-gear devices used in transmission of rotary motion. The cam-gear has N symmetric teeth, such that each half tooth subtends an angle of $\Delta\theta = 2\pi/2N = \pi/N$ radians. (Unless stated otherwise, all angles are assumed to be measured in radians.) Each tooth segment is made up of a linear spiral before smoothing, such that the radial travel over angle $\Delta\theta$ equals $\Delta R$. Let the letters BTM denote "before tip modification." Then, the maximum and minimum radii before tip modification are $R_{max\ BTM}$ and $R_{min\ BTM}$, respectively, and $$\Delta R = R_{max\ BTM} - R_{min\ BTM}.$$

The inner tooth tips are located at angles $\theta_{I,k}$, k=1,K,N and the outer tooth tips are located at angles $\theta_{O,k}$, k=1,K,N, such that $$\theta_{O,k} - \theta_{I,k} = \theta_{I,k+1} - \theta_{O,k} = \Delta\theta.$$

(1 should be used in place of N+1 if N+1 is reached in this formula.) The radius in the absence of tip modification is given by $$r = R_{minBTM} + \frac{\Delta R}{\Delta\theta}(\theta - \theta_{I,k})$$

when $\theta_{I,k} \leq \theta < \theta_{O,k}$, and by $$r = R_{maxBTM} - \frac{\Delta R}{\Delta\theta}(\theta - \theta_{O,k})$$

when $\theta_{O,k} \leq \theta < \theta_{I,k+1}$. The slope is $r'=\Delta R/\Delta\theta$ when $\theta_{I,k} < \theta < \theta_{O,k}$, $r' = -\Delta R/\Delta\theta$ when $\theta_{O,k} < \theta < \theta_{I,k+1}$, and is indeterminate at the tips. (Again, 1 should be used in place of N+1 if N+1 is reached in this formula.) The curvature r'' equals zero everywhere except at the tips, where it is indeterminate. (In this document, prime always denotes differentiation with respect to the angle $\theta$.)

$\theta_{ITM}$ and $\theta_{OTM}$ denote the angular extents of the tip modification regions measured from the inner and outer tooth tips, respectively; that is, the tooth forms are left unchanged as linear spirals unless the angle is between $\pm\theta_{ITM}$ of $\theta_{I,k}$ or between $\pm\theta_{OTM}$ of $\theta_{O,k}$.

Inner Tip Modification

When the angle $\theta$ is between $\pm\theta_{ITM}$ of $\theta_{I,k}$, the normalized inner tooth angle is defined as $$\tilde{\theta}_I = \frac{|\theta - \theta_{I,k}|}{\theta_{ITM}}.$$

It is clear that $0 \leq \tilde{\theta}_I \leq 1$. The extremes are $\tilde{\theta}_I=0$ when $\theta=\theta_{I,k}$ and $\tilde{\theta}_I=1$ when $\theta=\theta_{I,k}\pm\theta_{ITM}$. The desired smooth tip transition is achieved by use of a polynomial of degree n, where $n \geq 3$, as shown below:

$$R_{I,n} = a_0 + a_1\theta_I + a_2\theta_I^2 + \Lambda + a_n\theta_I^n.$$

The conditions that must be satisfied by the tip modification function $R_{I,n}$ are the following:

1. Match the unmodified radius when $\tilde{\theta}_I=1$:

$$R(\theta=\theta_{I,k}\pm\theta_{ITM})=R_{I,n}(\tilde{\theta}_I=1)=r(\theta=\theta_{I,k}\pm\theta_{ITM})$$

or $$a_0 + a_1 + a_2 + \Lambda + a_n = R_{minBTM} + \frac{\Delta R}{\Delta\theta}\theta_{ITM},$$

2. Match the unmodified slope when $\tilde{\theta}_I=1$:

$$R'(\theta=\theta_{I,k}+\theta_{ITM}) = \frac{1}{\theta_{ITM}} \cdot \frac{dR_{I,n}}{d\tilde{\theta}_I}\bigg|_{\tilde{\theta}_I=1} = r'(\theta=\theta_{I,k}+\theta_{ITM})$$

or $$a_1 + 2a_2 + \Lambda + na_n = \frac{\Delta R}{\Delta\theta}\theta_{ITM},$$

(Note that $r'(\theta=\theta_{I,k}-\theta_{ITM})$ is matched automatically by symmetry)

3. Match the unmodified curvature when $\tilde{\theta}_I=1$:

$$R''(\theta=\theta_{I,k}+\theta_{ITM}) = \frac{1}{\theta_{ITM}^2} \cdot \frac{d^2 R_{I,n}}{d\tilde{\theta}_I^2}\bigg|_{\tilde{\theta}_I=1} = r''(\theta=\theta_{I,k}+\theta_{ITM})$$

or $$2a_2 + 6a_3\Lambda + n(n-1)a_n = 0.$$

4. Achieve zero slope at $\tilde{\theta}_I=0$:

$$R'(\theta=\theta_{I,k}) = \frac{1}{\theta_{ITM}} \cdot \frac{dR_{I,n}}{d\tilde{\theta}_I}\bigg|_{\tilde{\theta}_I=0} = 0$$

or $$a_1 = 0,$$

and, if n>3,

5. Set all higher derivatives to zero at $\tilde{\theta}_I=0$:

$$R^{(j)}(\theta=\theta_{I,k}) = \frac{1}{\theta_{ITM}^j} \cdot \frac{d^j R_{I,n}}{d\tilde{\theta}_I^j}\bigg|_{\tilde{\theta}_I=0} = 0$$

for all $3 \leq j < n$, or, after some algebra, $$a_j = 0$$

for all $3 \leq j < n$.

The first two conditions assure smooth blending with the linear spiral, the third condition avoids stress concentrations due to abrupt curvature changes and the fourth condition effects smooth reversal of the track at the tip. The fifth condition minimizes the curvature of the track at the tip.

In light of the fourth and fifth statements, the simplified form of the polynomial is $$R_{I,n} = a_0 + a_2\theta_I^2 + a_n\theta_1^n,$$

subject to the conditions $$a_0 + a_2 + a_n = R_{minBTM} + \frac{\Delta R}{\Delta\theta}\theta_{ITM},$$

$$2a_2 + na_n = \frac{\Delta R}{\Delta\theta}\theta_{ITM}$$

and $$2a_2 + n(n-1)a_n = 0.$$

The solution to the above equations is given by:

$$a_0 = R_{minBTM} + \frac{\Delta R}{\Delta \theta}\theta_{ITM}\left(\frac{n-1}{2n}\right),$$

$$a_2 = \frac{\Delta R}{\Delta \theta}\theta_{ITM}\left(\frac{n-1}{2(n-2)}\right)$$

and $$a_n = -\frac{\Delta R}{\Delta \theta}\theta_{ITM}\left(\frac{1}{n(n-2)}\right).$$

Accordingly, the inner tooth tip is shortened by the amount $$\Delta_I = \frac{\Delta R}{\Delta \theta}\theta_{ITM}\left(\frac{n-1}{2n}\right)$$

and, if the letters ATM refer to "after tip modification," the following holds:

$$R_{min\ ATM} = R_{min\ BTM} + \Delta_I.$$

Outer Tip Modification

When the angle $\theta$ is between $\pm\theta_{OTM}$ of $\theta_{O,k}$, the normalized outer tooth angle is defined as $$\tilde{\theta}_O = \frac{|\theta - \theta_{O,k}|}{\theta_{OTM}}.$$

It is clear that $0 \leq \tilde{\theta}_O \leq 1$, and that $\theta_O = 0$ when $\theta = \theta_{O,k}$ and $\theta_O = 1$ when $\theta = \theta_{O,k} \pm \theta_{OTM}$. The smooth tip transition is achieved by use of a polynomial of degree n, where $n \geq 3$, as with the inner tips. The simplified form of the polynomial is:

$$R_{O,n} = b_0 + b_2\theta_O^2 + b_n\theta_O^n,$$

which arises from blending requirements analogous to those used in inner tip modification.

The resulting conditions on the coefficients are:

$$b_0 + b_2 + b_n = R_{maxBTM} - \frac{\Delta R}{\Delta \theta}\theta_{OTM},$$

$$2b_2 + nb_n = -\frac{\Delta R}{\Delta \theta}\theta_{OTM}$$

and $$2b_2 + n(n-1)b_n = 0.$$

The solution to the above equations is given by:

$$b_0 = R_{maxBTM} - \frac{\Delta R}{\Delta \theta}\theta_{OTM}\left(\frac{n-1}{2n}\right),$$

$$b_2 = -\frac{\Delta R}{\Delta \theta}\theta_{OTM}\left(\frac{n-1}{2(n-2)}\right)$$

and $$b_n = \frac{\Delta R}{\Delta \theta}\theta_{OTM}\left(\frac{1}{n(n-2)}\right).$$

Accordingly, the outer tooth tip is shortened by the amount $$\Delta_O = \frac{\Delta R}{\Delta \theta}\theta_{OTM}\left(\frac{n-1}{2n}\right)$$

and the following holds:

$$R_{max\ ATM} = R_{max\ BTM} - \Delta_O.$$

Choice of Tip Modification Angles

The above formulas apply to the centerline of the cam groove. At any point along this centerline, the radius of the circle that is locally tangent to the curve is given by $$R_c = \frac{(R^2 + R'^2)^{\frac{3}{2}}}{R^2 + 2R'^2 - RR''}.$$

The cam groove actually has a finite width 2 d, such that the radii of curvature of the tangent circles to the groove flank are reduced from $R_c$ by the half groove width d:

$$R_f = |R_c| - d.$$

The absolute value is used because the radius of curvature $R_c$ is negative for convex curves.

The choice of the tip modification angles $\theta_{ITM}$ and $\theta_{OTM}$ is made such that the minimum value of $R_f$, which occurs at the tips, is kept above zero and possibly above a chosen positive constant. Such judicious choice of $\theta_{ITM}$ and $\theta_{OTM}$ results in non-negative minimum radii of curvature $R_{fI}$ and $R_{fO}$ at the inner and outer tooth tips, respectively.

Figure 10:
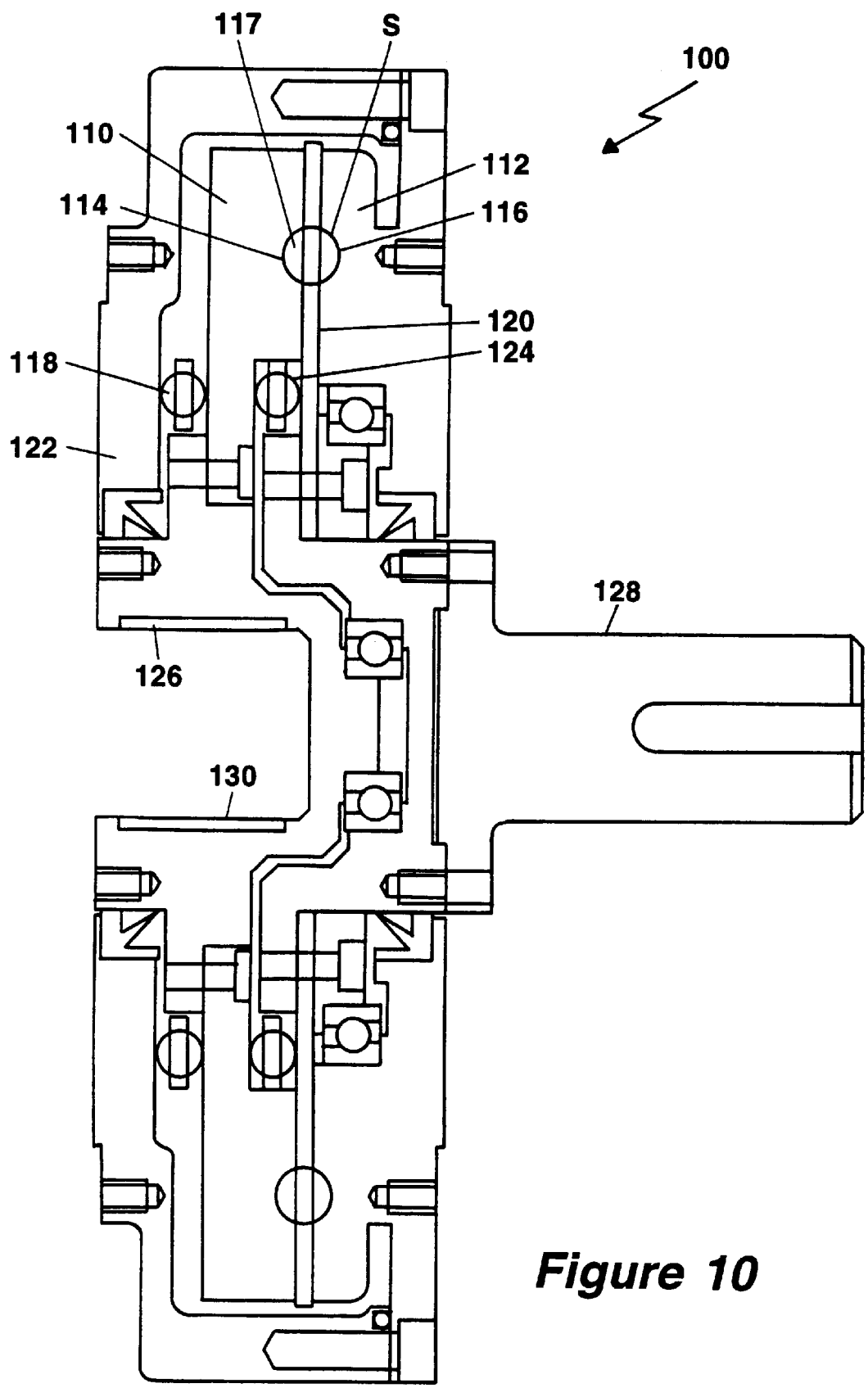
FIG. 10 is a side cross-section of a pancake embodiment of the invention.

FIG. 10 is a side cross-section of a pancake embodiment of the invention. In a pancake embodiment 100 of the invention, shown in FIG. 10, and preferably incorporating the conformity of FIG. 7 for higher capacity, a primary disk 110 has a cam-gear track 114 and faces a secondary disk 112 having secondary cam-gear track 116. Disk 112 is tied to and becomes a part of the grounded housing part 122. Balls 117 ride in slots S of reaction disk 120. In this embodiment the device input includes a rotating shaft 126. The shaft mates with and cooperates with a spline 130 on the center of rotating primary disk 110. This rotation moves balls 117 in slots S. The moving balls react against track 116 and drive against the flanks of the slots of the reaction cam-gear 120, driving the reaction cam-gear into rotation. The output shaft 128 is thereby rotated.

This embodiment further features spacer balls 118 and 124. These spacer balls 118 and 124 act as thrust bearings and simultaneously set the distances of the drive cam-gear from the housing and from the reaction disk, which makes for easy assembly and smooth running operation, avoiding disk on disk rubbing while maintaining disk parallelism. This simple device design has a substantial performance improvement versus when the disks are supported merely with radial bearings.

Figure 11:
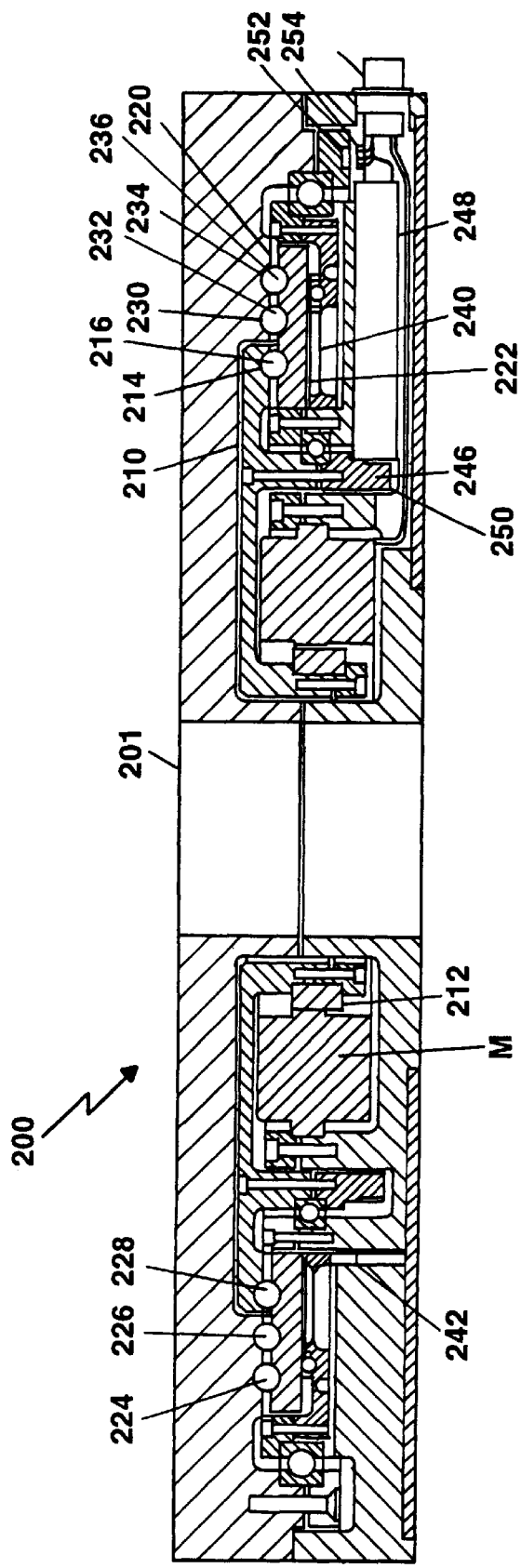
FIG. 11 is a side cross-section of a pancake rotary table of the invention having an open center.
Figure 11A:
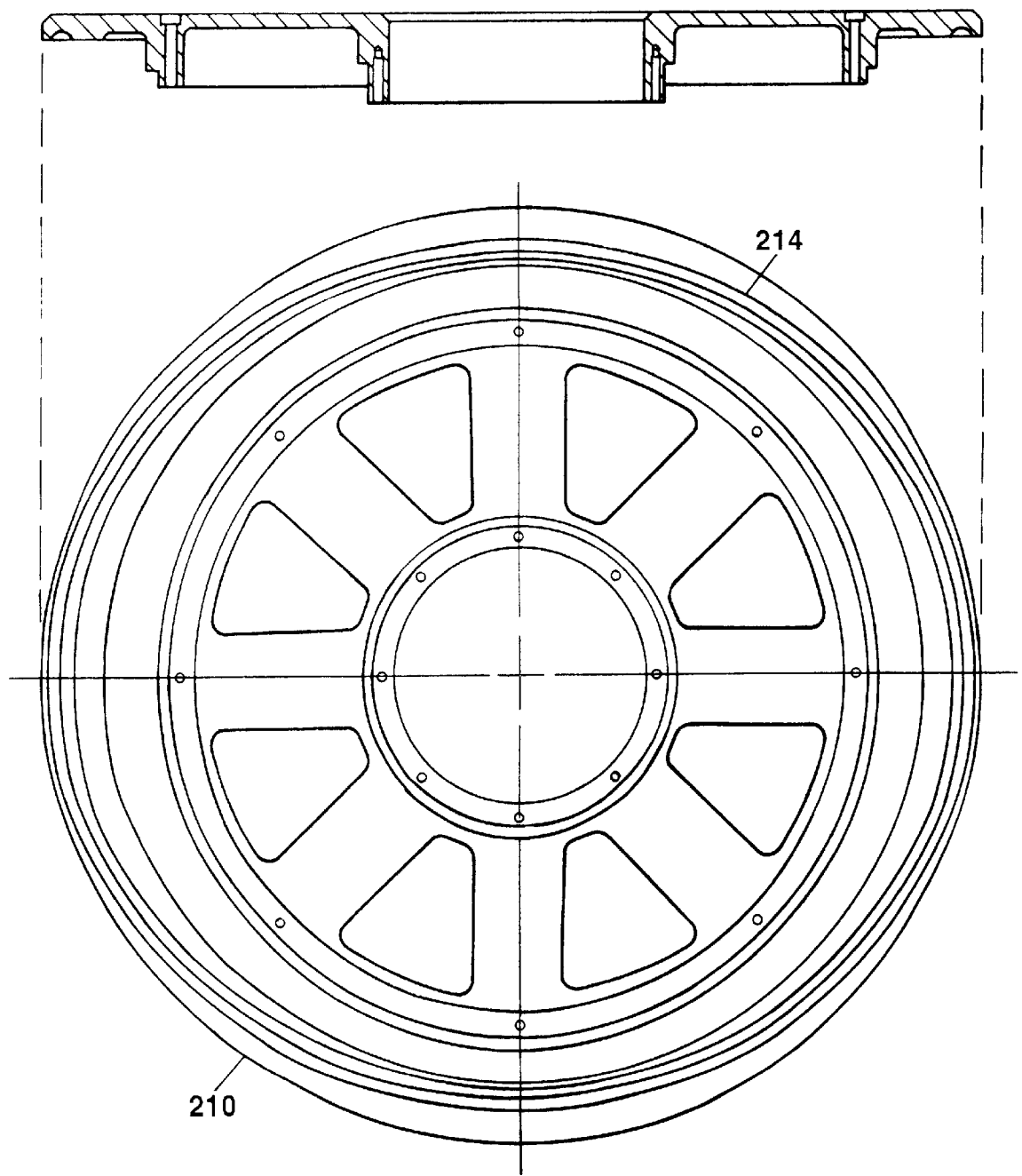
Figure 11B:
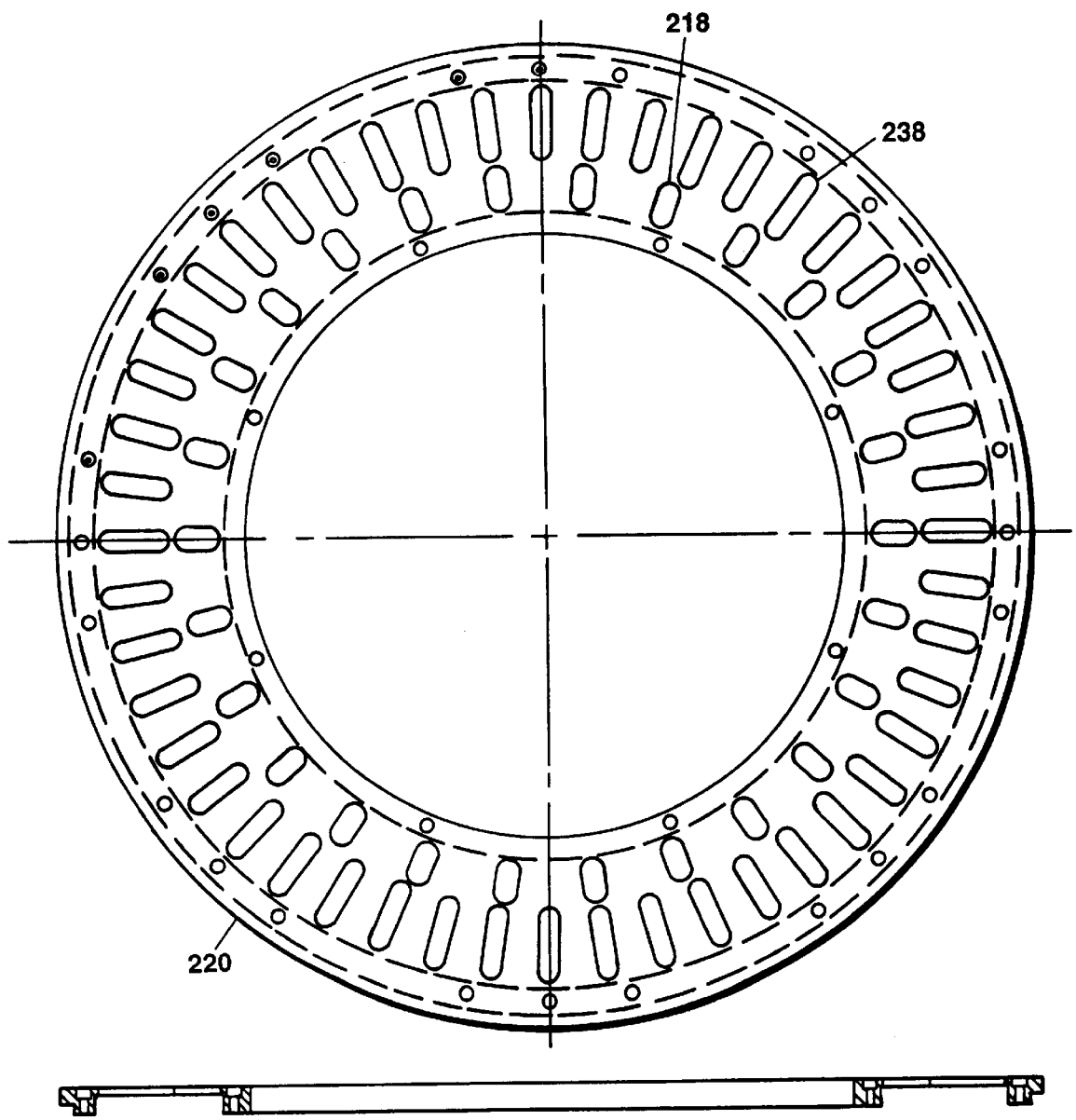
Figure 11C:
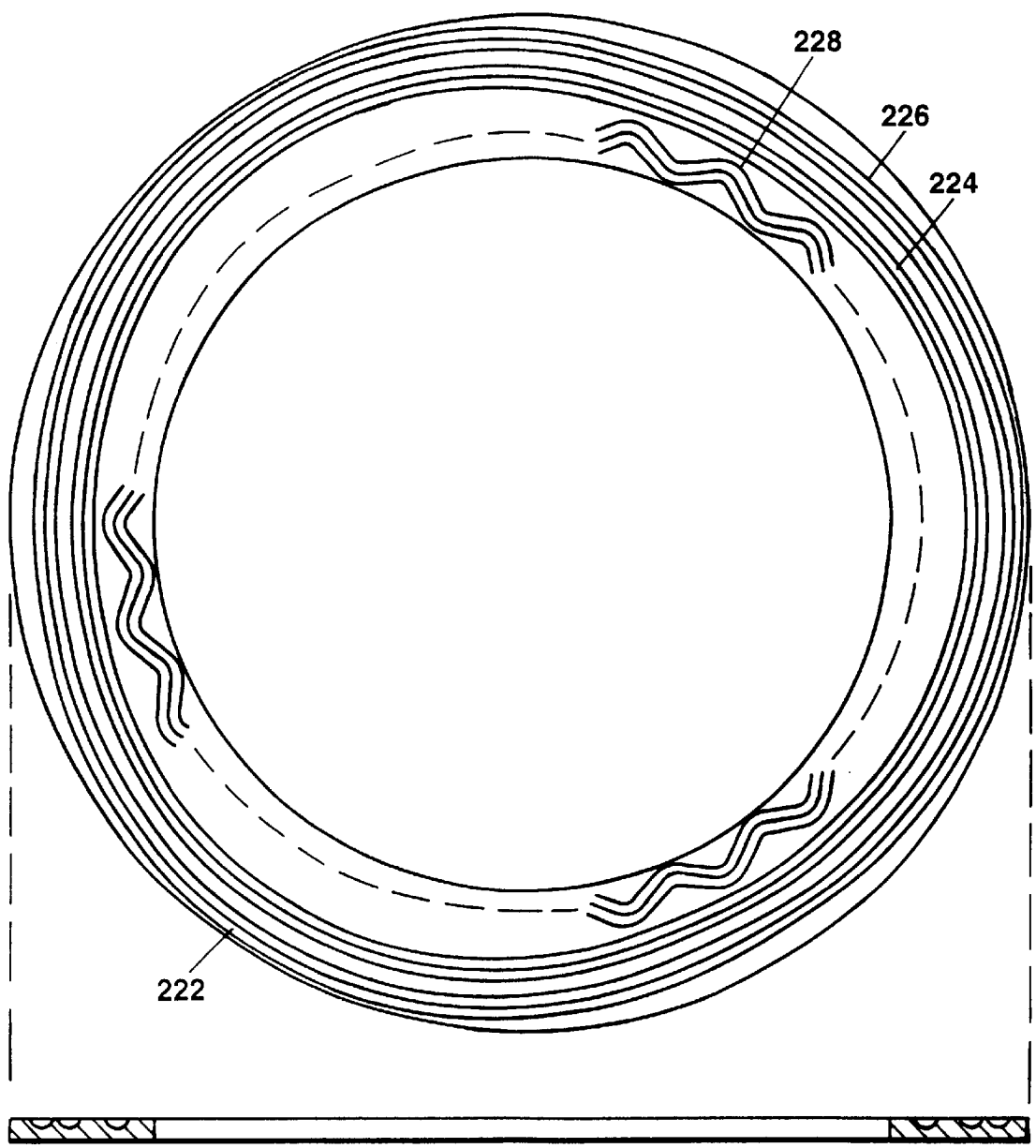
Figure 11D:
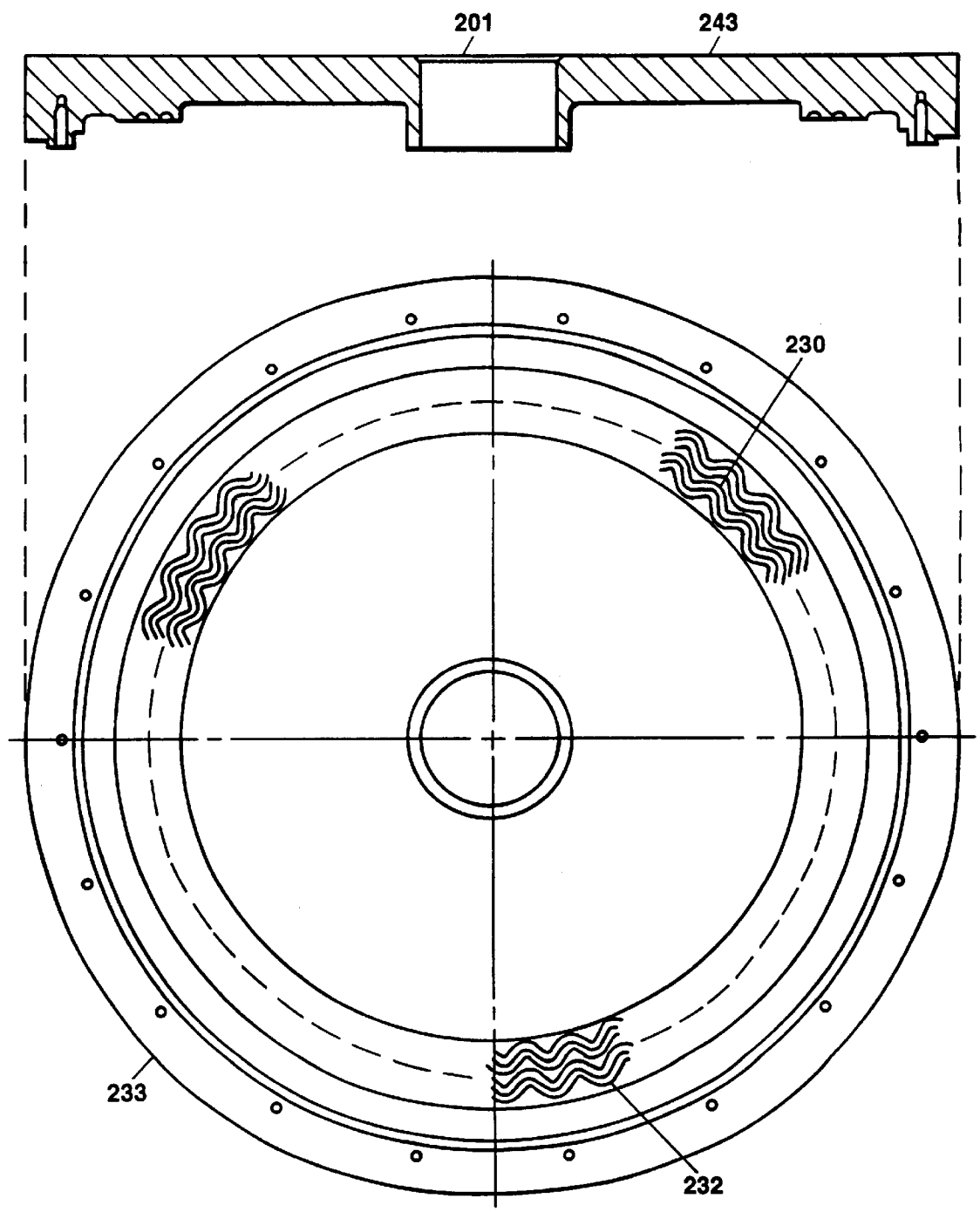

FIG. 11 is a side cross-section of a pancake rotary table 200 of the invention having an open center 201. FIG. 11(a) shows the first stage input disk 210 of FIG. 11. Motor rotor 212 is coupled to and drives input disk 210. Disk 210 has a first stage input cam-gear track 214 that drives balls 216 in first stage slots 218 of reaction disk 220, shown in FIG. 11(b). As shown in FIG. 11(c), the intermediate cam-gear bridge 222 has a first stage output cam-gear track 224. Balls 216 drive cam-gear track 224 into rotation. Also on this disk 222 is a pair of second stage input cam-gear tracks 226, 228 that drive second stage driven tracks 230, 232 on table top 233 via balls 234, 236 in second stage slots 238. FIG. 11(d) shows the table top and two second stage output cam-gears of FIG. 11.

In operation, table top 233 is put in motion by the frameless motor M of FIG. 11 wherein the motor rotor 212 rotates input disk 210 and its first stage input cam-gear track 214 that drives balls 216 in first stage slots 218 of reaction disk 220. Balls 216 drive the intermediate member 222 and its integral cam-gear track 224 into rotation, which in turn rotates the pair of second stage input cam-gear tracks 226, 228 that drive second stage driven tracks 230, 232 integral to table top 233 via balls 234, 236 in second stage slots 238.

Preload spring 240 applies an axial preload to intermediate bridge cam-gear 222 which assists in providing low backlash cooperation between the drive and driven stages. The preload can be adjusted via screw 242, which adjusts the load on spring 240. This preloaded arrangement is very cost effective in that it is possible to establish positioning accuracies measured in the arc seconds for this simple machined table.

A hall effect encoder 248 is mounted to the table base 246, and a steel encoder gear 250 is mounted on the rotating input. A home position magnet 252 and home position hall effect device 254 establish home position. When the motor is driven, preferably a frameless brushless dc pancake motor with open center, the home position magnet is read by the home position sensor for calibration of the motor drive. The encoder 248 reads the passing teeth of the encoder gear 250 to determine table top location.

This invention has a multiplicity of applications, including: automotive transmissions, robotics applications, manufacturing, precision positioning equipment, and the like. Various modifications of the specific embodiments set forth above are also within the spirit and scope of the invention. Nevertheless, the scope of these and other embodiments is limited only as set forth in the following claims.

What is claimed is:

1. A low-profile rotary drive apparatus for translating a rotary input to a driven rotary output, the apparatus comprising
   a) a first stage having: a drive member for coupling to a rotary source and having a first stage rotary driven member,
      a transmission member using first stage interacting elements for transmitting angular velocity and rotary motive force of said drive member to angular velocity and rotary motive force of said driven member, two of said members forming a conjugate pair of devices,
   b) a second stage having: second stage rotary drive member driven by said first stage rotary driven member and second stage rotary driven member driven by said second stage rotary drive member and a transmission member using second stage interacting elements for transmitting rotary drive force of said second stage rotary drive member to rotary force of said second stage rotary driven member,
      two of said second stage members forming a conjugate pair of devices,
   c) all of said members mounted coaxially, motion of a first one of said devices being translated to motion of a second one of the devices by said interacting elements,
   d) said system having a top platform part driven by said second stage rotary driven member and a bottom support part, said top part and bottom part mounted together to permit relative rotation therebetween, and
   e) various ones of said parts and members defining an internal cavity for receipt of said rotary drive source, said rotary drive source rotating said top part relative to said bottom part via rotation of said first stage rotary drive member.

2. The apparatus of claim 1 wherein a first of the pair of devices comprises a drive cam and a driven cam.

3. The apparatus of claim 1 wherein said transmission members comprise a plurality of radially extending slots.

4. The apparatus of claim 3 wherein ones of said members have cam faces which face each other, said slots being between said faces.

5. The apparatus of claim 4 wherein said members with cam faces comprise disks.

6. The apparatus of claim 1 wherein said first stage rotary driven member and said second stage rotary drive member are formed on a common part.

7. The apparatus of claim 6 wherein said common part defines a first stage driven track and a second stage drive track.

8. The apparatus of claim 4 wherein said translation members comprise a plurality of interacting elements, with a respective one of the elements associated with a respective one of the slots.

9. The apparatus of claim 1 wherein the translating members are axially and rotationally fixed and said elements are radially oscillatable.

10. The apparatus of claim 1 wherein said first stage input comprises a rotor of a frameless electric motor.

11. The apparatus of claim 10 wherein said rotor is integrated with said first stage.

12. The apparatus of claim 1 wherein said conjugate pair of devices defines a pair of cam-gears, each having inner teeth that satisfy the equation:

$$R_{min\ ATM} = R_{min\ BTM} + \Delta_I$$

and having outer teeth that satisfy the equation:

$$R_{max\ ATM} = R_{max\ BTM} - \Delta_O.$$

13. Speed conversion apparatus comprising
   a housing,
   a first stage having a drive member for being rotated and having a drive cam,
   driven member for being rotary driven and having a driven cam, and
   a conversion device including a reaction frame having a fixed length slot and a reciprocating interacting member for conversion of rotation of the drive cam to rotation of the driven cam, the interacting member, while reciprocating in the slot, interacting the two cams, whereby the driven member can be driven by the drive member and the speed of the driven member does not equal the speed of the drive member when the drive member is rotated, and
   a second stage having a second stage drive member for being rotated and having a drive cam, and having a driven member for being rotary driven and having a driven cam, and a second stage conversion device including a second stage reaction frame which is formed on said first stage reaction frame, said second stage reaction frame having a fixed length slot and a member for conversion of rotation of said second stage drive cam to rotation of said second stage driven cam, the second stage interacting member, while reciprocating in the slot, interacting the two second stage cams, whereby the second stage driven member can be driven by the second stage drive member and the speed of the said second stage driven member does not equal the speed of the second stage drive member when the second stage drive member is rotated by said first stage driven member, wherein said first stage rotary driven member and said second stage rotary drive member are formed on a common part, further comprising an internal frameless motor having a rotor coupled to and rotating said first stage drive member for driving said first stage driven member.

14. The apparatus of claim 7 wherein said common part further comprises a bridge joining said first stage output and said second stage input.

15. The apparatus of claim 14 further comprising a table top defining said second stage driven tracks.

* * * * *